(12) United States Patent
Kurosawa et al.

(10) Patent No.: US 10,519,889 B2
(45) Date of Patent: Dec. 31, 2019

(54) DIAGNOSTIC DEVICE

(71) Applicant: DENSO CORPORATION, Kariya, Aichi-pref. (JP)

(72) Inventors: Masanori Kurosawa, Kariya (JP); Kosuke Nakano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/766,032

(22) PCT Filed: Sep. 28, 2016

(86) PCT No.: PCT/JP2016/078606
§ 371 (c)(1),
(2) Date: Apr. 5, 2018

(87) PCT Pub. No.: WO2017/068920
PCT Pub. Date: Apr. 27, 2017

(65) Prior Publication Data
US 2018/0291830 A1    Oct. 11, 2018

(30) Foreign Application Priority Data

Oct. 21, 2015   (JP) .................................. 2015-207216

(51) Int. Cl.
| | |
|---|---|
| *F02D 41/22* | (2006.01) |
| *F01M 13/02* | (2006.01) |
| *F02D 41/18* | (2006.01) |
| *F02M 25/08* | (2006.01) |

(52) U.S. Cl.
CPC .......... *F02D 41/22* (2013.01); *F01M 13/022* (2013.01); *F02D 41/18* (2013.01); *F02M 25/0809* (2013.01); *F02D 2041/224* (2013.01)

(58) Field of Classification Search
CPC .............. F02D 41/18; F02D 2041/001; F02D 41/0045; F02D 41/22; F02D 41/222; F02M 25/0809; F02M 25/08
See application file for complete search history.

(56) References Cited

U.S. PATENT DOCUMENTS

| | | | | |
|---|---|---|---|---|
| 4,558,678 | A | * 12/1985 | Nishimura | ............. F02M 51/02 |
| | | | | 123/494 |
| 5,317,909 | A | 6/1994 | Yamada et al. | |
| 5,780,728 | A | * 7/1998 | Takamori | ........... F02M 25/0809 |
| | | | | 73/114.39 |
| 6,082,337 | A | * 7/2000 | Fujimoto | ........... F02M 25/0809 |
| | | | | 123/520 |
| 6,192,742 | B1 | * 2/2001 | Miwa | ................. F02M 25/0809 |
| | | | | 123/520 |

(Continued)

FOREIGN PATENT DOCUMENTS

| | | |
|---|---|---|
| JP | 06-213031 | 8/1994 |
| JP | 09-021359 | 1/1997 |

*Primary Examiner* — Long T Tran
(74) *Attorney, Agent, or Firm* — Nixon & Vanderhye P.C.

(57) ABSTRACT

An ECU functioning as a diagnostic device includes an information acquisition portion acquiring a flow rate of a fluid flowing through an intake pipe, and a diagnostic portion performing a diagnosis on a second purge pipe employed as a fuel gas pipe regarding a connection failure. The diagnostic portion diagnoses a connection failure of the fuel gas pipe according to magnitude of a pulsation of the flow rate acquired by the information acquisition portion.

8 Claims, 7 Drawing Sheets

(56) References Cited

U.S. PATENT DOCUMENTS

| | | | |
|---|---|---|---|
| 2002/0066440 A1* | 6/2002 | Kano | F02M 25/0818 |
| | | | 123/520 |
| 2006/0179928 A1* | 8/2006 | Shikama | F02M 25/0809 |
| | | | 73/114.39 |
| 2007/0157908 A1* | 7/2007 | Kano | F02M 25/08 |
| | | | 123/520 |
| 2011/0023852 A1 | 2/2011 | Yamashita | |
| 2012/0095669 A1* | 4/2012 | Katsurahara | F02D 41/221 |
| | | | 701/107 |
| 2014/0338636 A1* | 11/2014 | Irie | F02D 41/0062 |
| | | | 123/436 |

* cited by examiner

DIAGNOSTIC DEVICE

CROSS REFERENCE TO RELATED APPLICATION

This application is the U.S. national phase of International Application No. PCT/JP2016/078606 filed Sep. 28, 2016, which designated the U.S. and claims priority to Japanese Patent Application No. 2015-207216 filed on Oct. 21, 2015, the entire contents of each of which are incorporated herein by reference.

TECHNICAL FIELD

The present disclosure relates to a diagnostic device diagnosing a fuel gas pipe connected to an intake pipe of an engine.

BACKGROUND ART

A technique of supplying an unburned fuel gas to an intake pipe of an engine is used in the related art to improve fuel consumption of the engine. For example, Patent Literature 1 describes a device which temporarily traps a fuel gas generated in a fuel tank in a canister and supplies the trapped fuel gas to an intake pipe. The fuel gas is supplied from the canister to the intake pipe through a fuel gas pipe connected to the canister and the intake pipe. The fuel gas is purged from the canister by using a negative pressure which develops when combustion air flows through the intake pipe.

The device described in Patent Literature 1 diagnoses a fuel gas supply system including the canister. To be more specific, the device detects an internal pressure of the fuel tank and also diagnoses presence or absence of an abnormality in the supply system according to the detected internal pressure.

PRIOR ART LITERATURES

Patent Literature

Patent Literature 1: JP H04-318268 A

SUMMARY OF INVENTION

Inventors have conducted a detailed study and discovered a problem of the device described in Patent Literature 1 that a fuel gas may possibly be released to air from the fuel gas pipe, for example, in the event of a connection failure when the fuel pipe becomes disconnected from the intake pipe. Patent Literature 1 does not disclose a specific diagnostic method relating to such a connection failure of the fuel gas pipe.

The present disclosure has an object to provide a diagnostic device capable of diagnosing a connection failure of a fuel gas pipe.

A diagnostic device according to one aspect of the present disclosure diagnoses a fuel gas pipe connected to an intake pipe of an engine. The diagnostic device includes a flow rate acquisition portion acquiring a flow rate of a fluid flowing through the intake pipe, and a diagnostic portion performing a diagnosis on the fuel gas pipe regarding a connection failure. The diagnostic portion diagnoses a connection failure of the fuel gas pipe according to magnitude of a pulsation of the flow rate acquired by the flow rate acquisition portion.

Air is drawn in from an end of the intake pipe in absence of a connection failure of the fuel gas pipe whereas air is drawn in also from the intake pipe where the fuel gas pipe had been connected in the event of a connection failure of the fuel gas pipe. A portion from which the intake pipe draws in air is deemed as an open end in an intake system to the engine. Hence, when the air draw-in portion shifts in the event of a connection failure of the fuel gas pipe, a position of the open end in the intake system shifts, too. When the position of the open end shifts as above, a resonance point of a fluid flowing through the intake pipe varies, which causes magnitude of a pulsation of a flow rate of the fluid to vary.

According to the configuration as above, a connection failure of the fuel gas pipe is diagnosed according to magnitude of a pulsation of a flow rate of a fluid flowing through the intake pipe. Hence, by acquiring a flow rate of the fluid by means of the flow rate acquisition portion, a connection failure of the fuel gas pipe can be diagnosed according to magnitude of a pulsation of the flow rate.

According to the present disclosure, a diagnostic device capable of diagnosing a connection failure of a fuel gas pipe can be provided.

DESCRIPTION OF EMBODIMENTS

Hereinafter, embodiments will be described with reference to the accompanying drawings. For ease of description, same components are labelled with same reference numbers in the respective drawings wherever possible and a description of such components is not repeated.

First Embodiment

Figure 1:
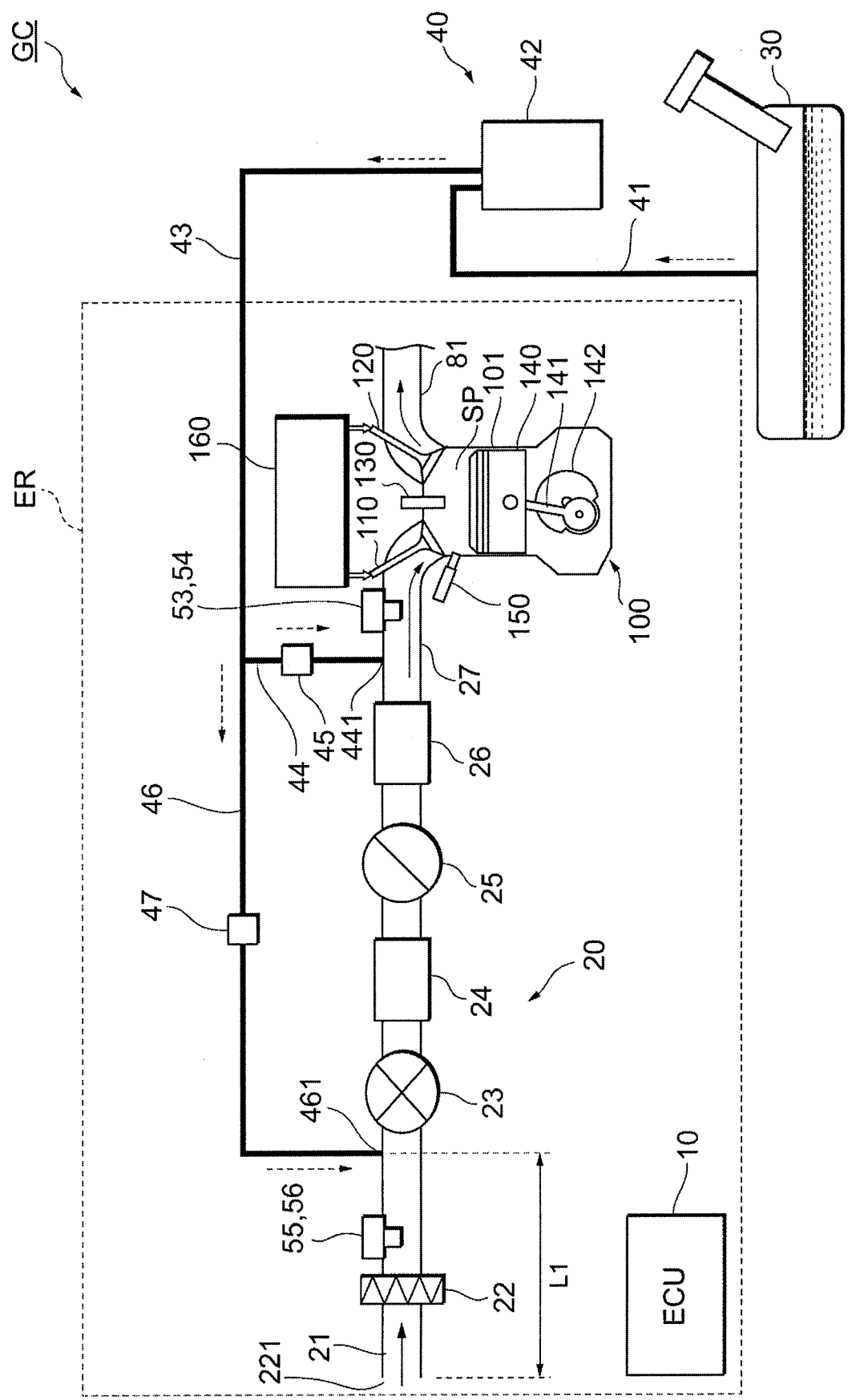
FIG. 1 is a schematic view of an ECU and other components according to a first embodiment.

An ECU 10 which is a diagnostic device according to a first embodiment will be described with reference to FIG. 1 through FIG. 6. A vehicle GC equipped with the ECU 10 will be described first. As is shown in FIG. 1, the vehicle GC includes an engine 100, an intake system 20, a fuel tank 30, and an evaporation gas supply system 40.

The engine 100 is an internal combustion engine running on gasoline as fuel. The engine 100 is disposed in an engine room ER of the vehicle GC. The engine 100 is a gasoline engine including three cylinders 101. All the cylinders 101 are of a same configuration and only one cylinder 101 is shown in FIG. 1. In the description below, the three cylinders 101 may be referred to as "a cylinder #1, "a cylinder #2", and "a cylinder #3" when distinguished from one another.

The cylinder 101 includes an intake valve 110, an exhaust valve 120, a variable valve timing mechanism 160, a spark plug 130, a piston 140, and an injector 150. An internal space of the cylinder 101 forms a combustion chamber SP as a space where a fuel-air mixture burns.

The intake valve 110 is a valve disposed to a portion where the intake pipe 21 and the cylinder 101 are connected. Air is supplied to the combustion chamber SP when the intake valve 110 opens. A supply of air to the combustion chamber SP stops when the intake valve 110 closes.

The exhaust valve 120 is a valve disposed to a portion where an exhaust pipe 81 and the cylinder 101 are connected. A combustion gas is discharged from the combustion chamber SP to the exhaust pipe 300 when the exhaust valve 120 opens. Discharging of the combustion gas from the combustion chamber SP to the exhaust pipe 300 stops when the intake valve 110 closes.

The variable valve timing mechanism 160 is a mechanism which opens and closes the intake valve 110 and the exhaust valve 120 individually. An intake stroke, a compression stroke, a combustion stroke, and an exhaust stroke take place repeatedly in the cylinder 101 while the variable valve timing mechanism 160 opens and closes the intake valve 110 and the exhaust valve 120 individually at appropriate timing.

The variable valve timing mechanism 160 includes an unillustrated VVT pulley and the like. Accordingly, opening and closing timing of the intake valve 110 and the exhaust valve 120 is not fixed constantly and made variable while the intake stroke, the compression stroke, the combustion stroke, and the exhaust stroke are taking place.

More specifically, the variable valve timing mechanism 160 is capable of hastening or delaying (advancing or retarding) opening and closing timing of the intake valve 110 and the exhaust valve 120 with respect to a rotation of a crankshaft 142 described below. Opening and closing actions of the intake valve 110 and the exhaust valve 120 are controlled by an ECU 10 described below.

The spark plug 130 is a device which ignites a fuel-air mixture in the combustion chamber SP by making a spark. Ignition timing by the spark plug 130, that is, timing when the combustion stroke is initiated is controlled by the ECU 10.

The piston 140 is a member which reciprocates in the cylinder 101 by moving up and down. The combustion chamber SP is an inner space of the cylinder 101 above the piston 140.

While the compression stroke is taking place in the cylinder 101, a volume of the combustion chamber SP decreases as the piston 140 moves upward. While the combustion stroke is taking place in the cylinder 101, the piston 140 is pushed downward due to combustion of the mixture in the combustion chamber SP. A connecting rod 141 and the crankshaft 142 are disposed below the piston 140. Reciprocal motion of the piston 140 is converted to rotational motion by the crankshaft 142 and the like. Combustion of fuel in the combustion chamber SP is thus converted to a drive force of the vehicle GC.

The injector 150 is an on-off valve to inject fuel into the combustion chamber SP. Opening and closing actions of the injector 150, that is, timing when fuel is supplied to the combustion chamber SP and a supply amount of fuel are controlled by a control device (ECU 10).

The intake system 20 is a portion which supplies combustion air to the respective cylinders 101 of the engine 100. The intake system 20 has an intake pipe 21, an air element 22, a compressor 23 (supercharger), an intercooler 24, a throttle valve 25, and a surge tank 26.

The intake pipe 21 is a tube-shaped member defining an inner channel. The intake pipe 21 has a multi-pipe intake manifold 27 at a downstream end. The intake pipe 21 draws in air outside the vehicle GC from an end 211 and introduces the air into the respective cylinders 101 of the engine 100 by splitting a flow of the air in the intake manifold 27.

The air element 22 is a filter member filtering out foreign matter from a passing fluid. The air element 22 is fitted to the intake pipe 21. Hence, the air element 22 filters out foreign matter in air drawn in from outside the vehicle GC and supplied to the engine 100.

The compressor 23 is a fluid machine forming a part of a supercharger and compressing a fluid by rotating. The compressor 23 is fitted to the intake pipe 21 at a portion downstream of the air element 22. The compressor 23 is coupled to an unillustrated turbine also forming a part of the supercharger. The turbine is a power engine converting energy of a fluid into mechanical power and provided in the exhaust pipe 81. When a combustion gas generated in the combustion stroke of the engine 100 flows through the exhaust pipe 81, the turbine rotates by using energy of the combustion gas. A rotation torque of the turbine is transmitted to the compressor 23 via an unillustrated shaft, which causes the compressor 23 to rotate. The compressor 23 thus draws in a fluid on an upstream side of the intake pipe 21, compresses the fluid, and supplies the compressed fluid to a downstream side.

The intercooler 24 is a heat exchanger fitted to the intake pipe 21 at a portion downstream of the compressor 23. The intercooler 24 defines an unillustrated inner channel. A fluid which is compressed by the compressor 23 and becomes hot is supplied to the inner channel of the intercooler 24. Air flowing through the inner channel dissipates heat by exchanging heat with air flowing outside the intercooler 24 and becomes cold.

The throttle valve 25 is an on-off valve fitted to the intake pipe 21 at a portion downstream of the intercooler 24. The throttle valve 25 has an electric motor and a valving element, neither of which is shown in FIG. 1. The electric motor is driven according to a control signal received from the ECU 10 described below and moves the valving element. A degree of opening of the inner channel of the throttle valve 25 is adjusted by moving the valving element.

The surge tank 26 is a device shaped like a container and fitted to the intake pipe 21 at a portion downstream of the surge tank 26. A sectional area of the intake pipe 21 is larger in the surge tank 26 than in the other portions. Owing to such a configuration, even when a pressure fluctuates accidentally in one of the cylinders 101 of the engine 100, an adverse effect on the other cylinders 101 can be lessened.

The fuel tank 30 is a container where gasoline used as fuel of the engine 100 is stored. Normally, fuel in a liquid form is stored in the fuel tank 30. The fuel tank 30 has an unillustrated fuel pump inside. The fuel pump is driven according to a control signal received from the ECU 10 and supplies fuel to an unillustrated fuel supply pipe connected to the fuel tank 30. The supplied fuel is introduced to the injector 150 through the fuel supply pipe and the like and ejected into the combustion chamber SP of the cylinder 101.

The evaporation gas supply system 40 is a portion which supplies a fuel gas, namely a gaseous gasoline generated in the fuel tank 30 (hereinafter, referred to also as an evaporation gas), to the intake pipe 21. The evaporation gas supply system 40 has a communication pipe 41, a canister 42, and a purge pipe 43.

The communication pipe 41 is a tube-shaped member disposed between the fuel tank 30 and the canister 42 with one end connected to the former and the other end to the latter. The fuel tank 30 and the canister 42 communicate with each other through the communication pipe 41.

An unillustrated absorbent material is disposed in an inner space of the canister 42. Examples of the absorbent material include but not limited to activated carbon and a porous member having a large number of fine pores on a surface. The canister 42 is provided with an unillustrated relief opening and opened to air at the relief opening.

The purge pipe 43 is a tube-shaped member connected to the canister 42 at one end. The purge pipe 43 is formed to extend from the canister 42 and has a first purge pipe 44 and a second purge pipe 46 (a fuel gas pipe, a purge pipe) by splitting at a midpoint. An end 441 of the first purge pipe 44 is connected to the intake manifold 27. A first purge valve 45 formed of an on-off valve is fitted to the first purge pipe 44 at a midpoint. An end 461 of the second purge pipe 46 is connected to the intake pipe 21. To be more specific, the end 461 of the second purge pipe 46 is connected to the intake pipe 21 at a portion upstream of the compressor 23 and downstream of the air element 22. A second purge valve 47 formed of an on-off valve is fitted to the second purge pipe 46 at a midpoint.

A function of the evaporation gas supply system 40 configured as above will now be described. When fuel evaporates and an evaporation gas is generated in the fuel tank 30, the evaporation gas is introduced to the canister 42 through the communication pipe 41.

The evaporation gas introduced to the canister 42 is absorbed into the absorbent material disposed in the inner space. When the purge pipe 43 is evacuated to a negative pressure, the evaporation gas absorbed in the absorbent material is released under an action of the negative pressure.

For example, when the engine 100 is running without driving the compressor 23, both of the first purge valve 45 and the second purge valve 47 open. Hence, a negative pressure develops as air flows through the intake pipe 21 and the downstream intake manifold 27 and acts on the purge pipe 43 and the canister 42 via the first purge pipe 44 and the second purge pipe 46. When the canister 42 is evacuated to a negative pressure, air drawn in from the relief opening passes through the absorbent material. The evaporation gas is thus released from the absorbent material to air.

Meanwhile, when the engine 100 is running with driving the compressor 23, the second purge valve 47 alone opens. As has been described, the second purge pipe 46 fitted with the second purge vale 47 is connected to the intake pipe 21 at a portion upstream of the compressor 23. Hence, a negative pressure which develops with the driving of the compressor 23 acts on the purge pipe 43 and the canister 42 via the second purge pipe 46. When the canister 42 is evacuated to a negative pressure, air is drawn in from the relief opening and passes through the absorbent material. The evaporation gas is thus released from the absorbent material to air.

An internal pressure of the intake manifold 27 located downstream of the compressor 23 is positive while the compressor 23 is driven. Hence, the first purge valve 45 closes to prevent a fluid from flowing into the first purge pipe 44 from the intake manifold 27.

The evaporation gas released from the absorbent material in the canister 42 in the manner as above flows into the intake pipe 21 and mixes with air drawn in from the end 211. A resulting mixture of the evaporation gas and air is introduced into the respective cylinders 101 of the engine 100 by directly flowing through the intake pipe 21. Consequently, fuel consumption of the engine 100 can be improved by using the evaporation gas to run the engine 100 without releasing the evaporation gas to air.

By providing two pipes, namely the first purge pipe 44 and the second purge pipe 46, a chance of evacuating the canister 42 to a negative pressure can be ensured even in a configuration in which the compressor 23 is fitted to the intake pipe 21. Consequently, the evaporation gas can be released from the absorbent material in a reliable manner.

The ECU (Electronic Control Unit) 10 will now be described with reference to FIG. 2. The ECU 10 (diagnostic device) is formed of an analog circuit or formed as a digital processor, either entirely or partly. In either case, the ECU 10 functions to output a control signal according to a received signal and is therefore provided with functional control blocks.

Figure 2:
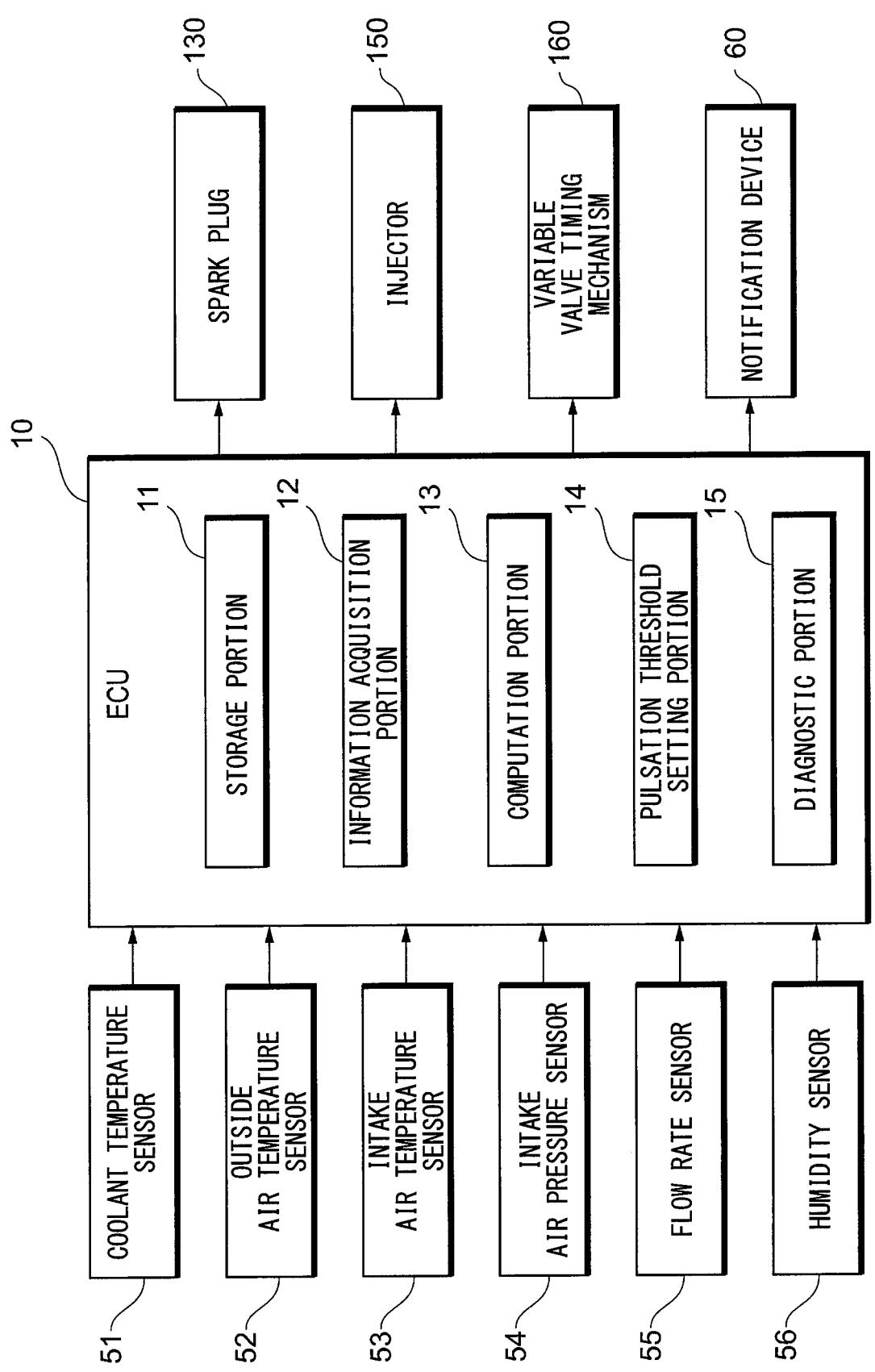
FIG. 2 is a functional block diagram of the ECU of FIG. 1.

FIG. 2 is a functional block diagram of the ECU 10. Software modules incorporated in an analog circuit or a digital processor forming the ECU 10 are not necessarily divided as control blocks shown in FIG. 2. That is, an actual analog circuit or module may be formed to function as multiple control blocks shown in FIG. 2 or may be divided to smaller segments. An actual internal configuration of the ECU 10 can be modified as needed by anyone skilled in the art as long as the ECU 10 is capable of performing processing described below.

The ECU 10 is electrically connected to a coolant temperature sensor 51, an outside air temperature sensor 52, an intake air temperature sensor 53, an intake air pressure sensor 54, a flow rate sensor 55, and a humidity sensor 56.

The coolant temperature sensor 51 is provided to an unillustrated cooling circuit which circulates a coolant in the engine 100. The coolant temperature 51 generates a signal corresponding to a temperature of the coolant and sends the signal to the ECU 10.

The outside air temperature sensor 52 is disposed to the vehicle GC at a portion exposed to outside air. The outside air temperature sensor 52 generates a signal corresponding to an outside air temperature and sends the signal to the ECU 10.

The inside air temperature sensor 53 is fitted to the intake manifold 27 shown in FIG. 1. The intake air temperature sensor 53 generates a signal corresponding to a temperature of a fluid flowing through the intake manifold 27 and sends the signal to the ECU 10.

The intake air pressure sensor 54 is fitted to the intake manifold 27 shown in FIG. 1. The intake air pressure sensor 54 generates a signal corresponding to a pressure of a fluid flowing through the intake manifold 27 and sends the signal to the ECU 10. While the compressor 23 is driven, compressed air is supplied from the compressor 23. Hence, a pressure of a fluid flowing through the intake manifold 27 takes a positive value. Meanwhile, while the compressor 23 is at rest, a negative pressure develops because the piston 140 moves downward in the cylinder 101. Hence, a pressure of a fluid flowing through the intake manifold 27 takes a negative value. That is, whether the compressor 23 is driven or at rest can be determined according to a pressure of a fluid flowing through the intake manifold 27.

The flow rate sensor 55 is fitted to the intake air pipe 21 at a portion downstream of the air element 22 and upstream of the end 461 of the second purge pipe 46. The flow rate sensor 55 generates a signal corresponding to a flow rate of a fluid flowing through the intake pipe 21 and sends the signal to the ECU 10. The flow rate sensor 55 is capable of generating signals corresponding to flow rates of both a fluid flowing through the intake pipe 21 from the end 211 toward the engine 100 (hereinafter, referred to as a forward direction) and a fluid flowing in a reverse direction (hereinafter, referred to as a backward direction), and sending the signals.

The humidity sensor 56 is fitted to the intake pipe 21 at a portion downstream of the air element 22 and upstream of the end 461 of the second purge pipe 46. The humidity sensor 56 generates a signal corresponding to a humidity of a fluid flowing through the intake pipe 21 and sends the signal to the ECU 10.

The ECU 10 is also electrically connected to vehicle-mounted devices including the spark plug 130, the injector 150, the variable valve timing mechanism 160, and a notification device 60. The ECU 10 adjusts ignition timing of a mixture in the combustion chamber SP and an amount and injection timing of fuel injected by the injector 150 by adjusting a voltage applied to the spark plug 130 and the injector 150. The notification device 60 is a device which provides various notifications to an occupant in the vehicle GC. The notification device 60 is formed of a known device, for example, a display panel or a buzzer. The ECU 10 controls an operation of the notification device 60 by sending a control signal.

The phrase, "electrically connected", referred to herein is not limited to a formation in which one component is connected to another component by a signal line and includes a formation in which two or more components are enabled to wirelessly communicate with each other.

The ECU 10 has a storage portion 11, an information acquisition portion 12 (flow rate acquisition portion), a computation portion 13, a pulsation threshold setting portion 14, and a diagnostic portion 15.

The storage portion 11 is a portion in which various types of information is stored. The storage portion 11 is formed of, for example, a not-volatile memory. Information on a map and the like is pre-stored in the storage portion 11. The stored information is read out by the information acquisition portion 12 or the like and used for a predetermined computation. The storage portion 11 is capable of storing a result of a computation by the information acquisition portion 12 or the like.

The information acquisition portion 12 is a portion which acquires information on and related to a running state of the engine 100 by performing predetermined computations according to signals received from the respective sensors. More specifically, the information acquisition portion 12 acquires a temperature of the coolant by performing a predetermined computation according to a signal received from the coolant temperature sensor 51. The information acquisition portion 12 acquires an outside air temperature by performing a predetermined computation according to a signal received from the outside air temperature sensor 52. The information acquisition portion 12 acquires a temperature and a pressure of a fluid flowing through the intake manifold 27 by performing predetermined computations according to signals received from the intake air temperature sensor 53 and the intake air pressure sensor 54, respectively. The information acquisition portion 12 acquires a flow rate and a humidity of a fluid flowing through the intake pipe 21 by performing predetermined computations according to signals received from the flow rate sensor 55 and the humidity sensor 56, respectively.

The computation portion 13 is a portion which computes a control parameter necessary to control the vehicle-mounted devices, such as the spark plug 130. The computation portion 13 reads out information stored in the storage portion 11 and computes a control parameter according to the information acquired by the information acquisition portion 12 for the engine 100 to run in an appropriate state.

The pulsation threshold setting portion 14 is a portion which sets a pulsation threshold Rpc described below. The pulsation threshold Rpc is used by the diagnostic portion 15 when performing a diagnosis.

The diagnostic portion 15 is a portion which performs a diagnosis on the second purge pipe 46 regarding a connection failure described below.

The vehicle GC configured as above has a potential risk of an inconvenience related to processing of an evaporation gas in the event of a connection failure of the second purge pipe 46. That is, when the end 461 of the second purge pipe 46 normally connected to the intake pipe 21 becomes disconnected from the intake pipe 21 due to an impact from the outside, an evaporation gas flowing through the second purge pipe 46 may possibly be released to air.

In order to forestall such an inconvenience, the ECU 10 performs processing to diagnose a connection failure of the second purge pipe 46 (fuel gas pipe, purge pipe). The following will describe a diagnosis performed by the ECU 10 with reference to FIG. 3 through FIG. 6.

Figure 3:
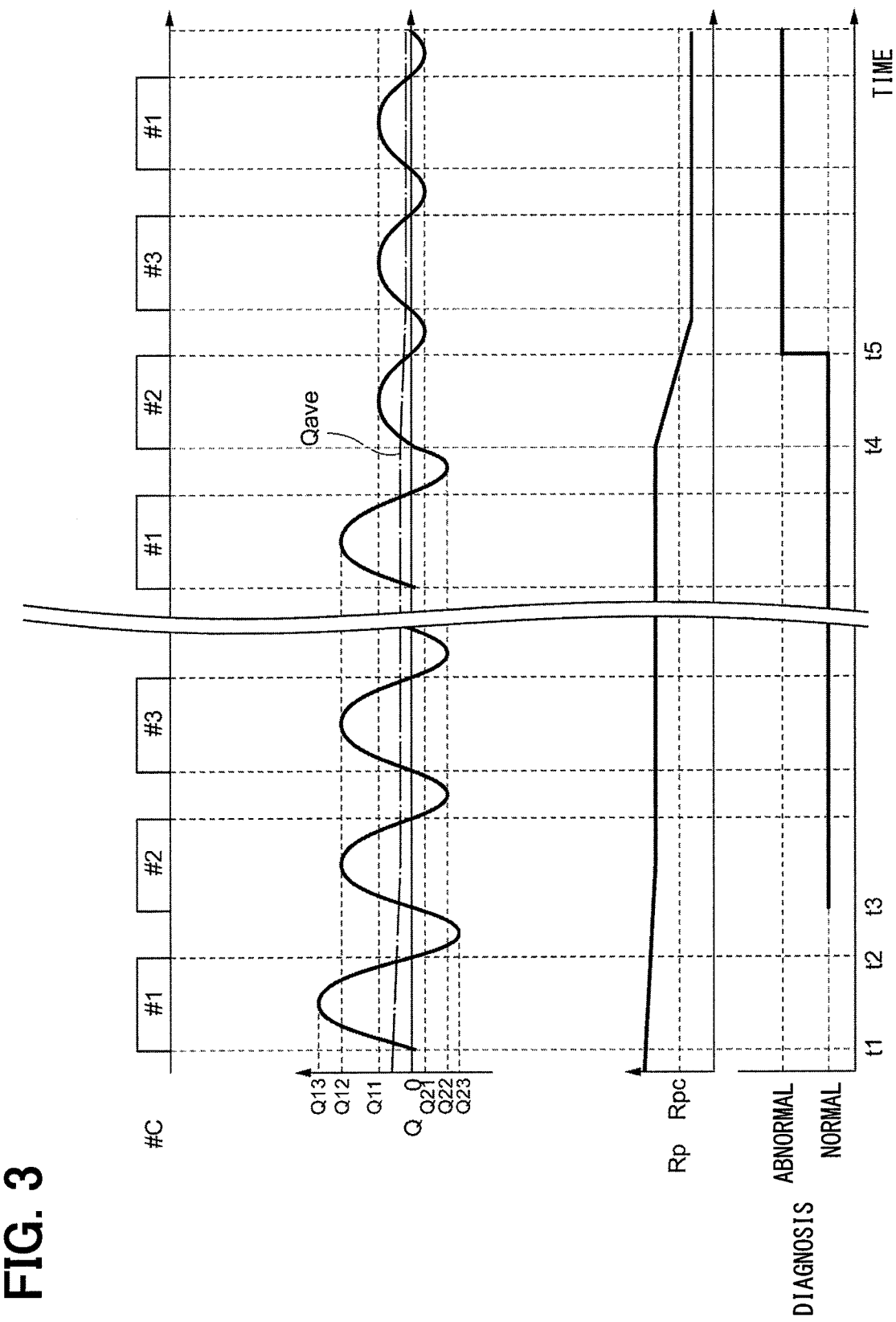
FIG. 3 shows a timing chart showing an example of processing performed by the ECU of FIG. 1.

FIG. 3 shows cylinder numbers, #C, assigned to the respective cylinders 101 of the engine 100 to indicate in which one of the cylinders #1 through #3 the intake stroke is taking place, a flow rate Q of a fluid flowing through the intake pipe 21, and an example of a variance in the flow rate Q. The flow rate Q takes a positive value when the fluid flows in the forward direction and a negative value when the fluid flows in the backward direction.

FIG. 3 also shows a pulsation rate Rp and an example of a change of diagnosis results of the diagnostic portion 15. The pulsation rate Rp indicates a degree of a pulsation of the flow rate Q during a time zone from initiation of the intake stroke in one of the three cylinders 101 of the engine 100 to initiation of the intake stroke in another cylinder 101. To be more specific, let Qave be an average of the flow rate Q of a fluid flowing through the intake pipe 21 which increases to a maximum Qmax and decreases to a minimum Qmin during the time zone. Then, the pulsation rate Rp is expressed by Equation f1 below. In Equation f1 below, Qmax is a positive value and Qmin is a negative value. Hereinafter, (Qmax−Qmin) indicating a fluctuation range of the flow rate Q is referred to as "magnitude of a pulsation of the flow rate Q" during the time zone.

$$Rp=(Qmax-Qmin)*0.5/Qave*100 \tag{f1}$$

The intake stroke is initiated in the cylinder #1 of the engine 100 at a time t1 when the intake value 110 is opened and the position 140 starts to move downward from a top dead point in the cylinder #1. Accordingly, a fluid flows through the intake pipe 21 in the forward direction and the flow rate Q increases. The flow rate Q increases to Q13 and then decreases while the intake stroke is taking place in the cylinder #1. Q13 is a positive value.

The intake stroke ends in the cylinder #1 of the engine 100 at a time t2 when the piston 140 reaches a bottom dead point and the intake valve 110 is closed in the cylinder #1. Accordingly, the flow rate Q of the fluid flowing through the intake pipe 21 drops temporarily to zero.

When the intake valve 110 is closed in the cylinder #1 of the engine 100 at the time t2, the fluid flowing in the forward direction is blocked and a pressure of the fluid rises near the intake valve 110. A pressure difference is thus produced in the intake pipe 21 between a point near the intake valve 110 and an upstream point and the fluid starts to flow in the backward direction after the time 2. The flow rate Q decreases to Q23 and then rises. The flow rate Q becomes temporarily zero at a time t3 when the intake stroke is initiated in the cylinder #2 of the engine 100. Q23 is a negative value.

In the manner as above, a pulsation of the flow rate Q appears during a time zone from the time t1 when the intake stroke is initiated in the cylinder #1 to the time t3 when the intake stroke is initiated in the cylinder #2. The ECU 10 calculates an average of the flow rate Q during the time zone and substitutes the computed average for Qave in Equation f1 above. Further, the ECU 10 calculates a pulsation rate Rp in accordance with Equation f1 above by substituting Q13 for Qmax and Q23 for Qmin. Such a pulsation of the flow rate Q appears also when the intake stroke takes place in the cylinder #2 and the cylinder #3 at the time t3 and later.

During the time zone from the time t1 to the time t3, a rotation speed of the engine 100 is above a rotation speed threshold Nc described below. The rotation speed threshold Nc is a pre-set value. When a rotation speed of the engine 100 is above the rotation speed threshold Nc, the ECU 10 does not perform a diagnosis on the second purge pipe 46 regarding a connection failure.

The ECU 10 starts to perform a diagnosis on the second purge pipe 46 regarding a connection failure when the rotation speed of the engine 100 decreases to or below the rotation speed threshold Nc at the time t3. The flow rate Q pulsates between a maximum Q12 and a minimum Q22 when the rotation speed of the engine 100 decreases. Q12 is a value smaller than Q13 and Q22 is a value larger than Q23. That is, magnitude of a pulsation of the flow rate Q at and after the time t3 is smaller than magnitude during the time zone from the time t1 to the time t3.

The ECU 10 calculates the pulsation rate Rp in accordance with Equation f1 above by using Q12, Q22, and average values calculated in the respective time zones. When the calculated pulsation rate Rp is above the pulsation threshold Rpc, the ECU 10 diagnoses that a connection of the second purge pipe 46 is normal. The pulsation threshold Rpc is a value set by the pulsation threshold setting portion 14.

In a case where a connection failure of the second purge pipe 46 occurs at a time t4, the flow rate Q pulsates between a maximum Q11 and a minimum Q21 at and after the time t4. Q11 is a value smaller than Q12 and Q21 is a value larger than Q22. That is, magnitude of a pulsation of the flow rate Q at and after the time t4 is smaller than magnitude before the time t4.

Such a variance in magnitude of the pulsation is thought to occur due to shifting of an open end of the intake pipe 21. More specifically, when the end 461 of the second purge pipe 46 shown in FIG. 1 becomes disconnected from the intake pipe 21, air is drawn in also from a midpoint of the intake pipe 21 where the end 461 had been connected. That is, a position of the open end of the intake pipe 21 shifts toward the engine 100 by a distance L1 specified in FIG. 1.

The pulsation rate Rp decreases as magnitude of the pulsation of the flow rate Q becomes smaller at and after the time t4. The ECU 10 diagnoses a connection failure of the second purge pipe 46 at a time t5 when the pulsation rate Rp decreases below the pulsation threshold Rpc.

Figure 4:
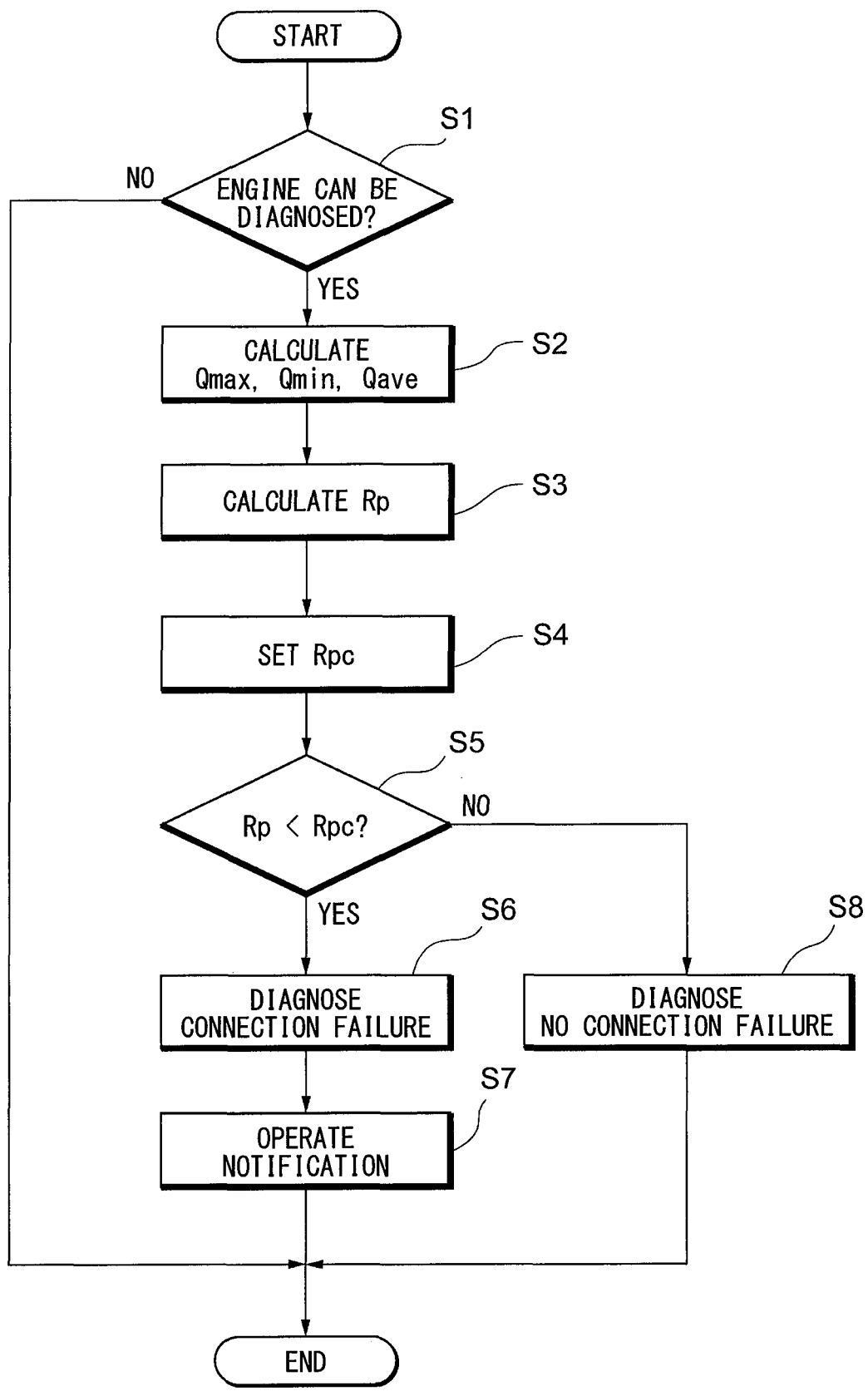
FIG. 4 is a flowchart depicting the processing performed by the ECU of FIG. 1.

FIG. 4 shows a flowchart depicting a flow of the processing by the ECU 10 as above. The ECU 10 performs the processing depicted in FIG. 4 at every predetermined timing. In the following, processing performed by the diagnostic portion 15 or the like in the ECU 10 in a strict sense is described as the processing performed by the ECU 10 for ease of description.

Firstly, the ECU 10 determines in Step S1 of FIG. 4 whether the engine 100 is in a state where a connection failure of the second purge pipe 46 can be diagnosed. To more specific, the ECU 10 determines whether a rotation speed of the engine 100 is at or below the rotation speed threshold Nc and the compressor 23 is at rest.

When a rotation speed of the engine 100 is above the rotation speed threshold Nc, it becomes difficult to diagnose a connection failure of the second purge pipe 46 with accuracy as will be described below. Also, a state where the compressor 23 is driven is not suitable to diagnose a connection failure of the second purge pipe 46 because a fluid is forced to flow the intake pipe 21 and a pulsation of the flow rate varies only a little. Whether the compressor 23 is driven or at rest can be determined according to a pressure of the fluid flowing through the intake manifold 27 as described above.

When it is determined in Step S1 that either a rotation speed of the engine 100 is above the rotation speed threshold Nc or the compressor 23 is driven or a rotation speed of the engine 100 is above the rotation speed threshold Nc while the compressor 23 is driven, the ECU 10 ends the processing without performing processing in Step S2 and subsequent steps. Meanwhile, when it is determined that a rotation speed of the engine 100 is at or below the rotation speed threshold Nc and the compressor 23 is at rest, the ECU 10 proceeds to Step S2.

In Step S2, the ECU 10 calculates a maximum Qmax, a minimum Qmin, and an average Qave of a flow rate Q of the fluid flowing through the intake pipe 21. As has been described above, the maximum Qmax and so on are calculated according to a flow rate Q during a time zone from initiation of the intake stroke in one of the three cylinders 101 of the engine 100 to initiation of the intake stoke in another cylinder 101.

In subsequent Step S3, the ECU 10 calculates the pulsation rate Rp. The ECU 10 calculates the pulsation rate Rp in accordance with Equation f1 above by using the maximum Qmax and so on calculated in Step S2.

In subsequent Step S4, the ECU 10 sets the pulsation threshold Rpc. The following will describe in detail how the pulsation threshold Rpc is set with reference to FIG. 5 and FIG. 6.

Figure 5:
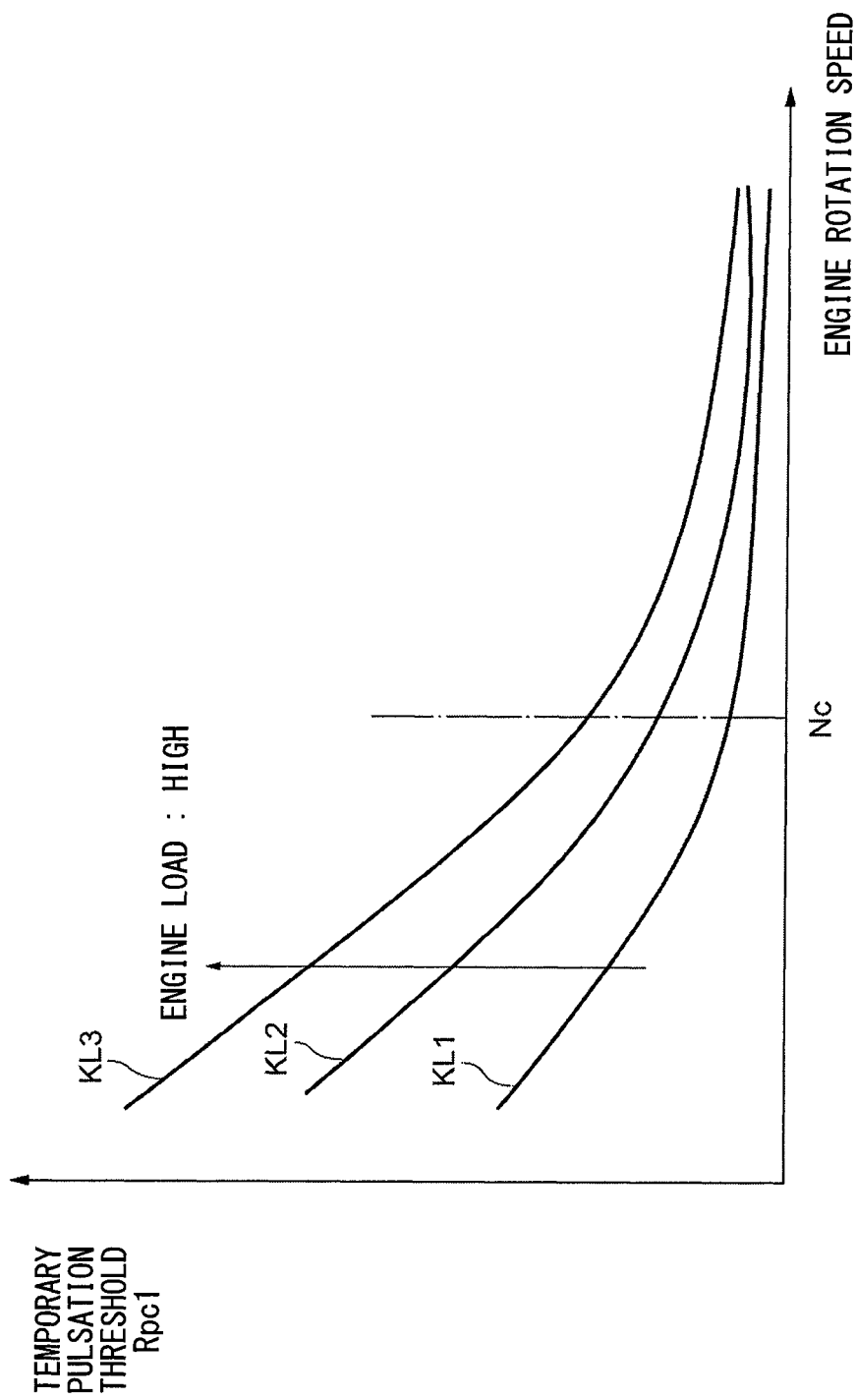
FIG. 5 is a view showing a relationship among an engine speed, a temporary pulsation threshold, and an engine load.

FIG. 5 shows a graph of a temporary pulsation threshold Rpc1 which is deemed as being an appropriate pulsation threshold in terms of a load of the engine 100. In the graph of FIG. 5, a rotation speed of the engine 100 is plotted along an abscissa and the temporary pulsation threshold Rpc1 is plotted along an ordinate.

In the graph, lines KL1, KL2, and KL3 indicate relationships between a rotation speed of the engine 100 and the temporary pulsation threshold Rpc1, respectively, at loads KL1, KL2, and KL3 of the engine 100 when a connection of the second purge pipe 46 to the intake pipe 21 is normal.

For example, when the engine 100 is running at a load KL2, the pulsation rate Rp of the flow rate Q in such a circumstance takes a value on or above the line KL2 of FIG. 5 unless a connection failure of the second purge pipe 46 occurs. On the contrary, in the event of a connection failure of the second purge pipe 46, the pulsation rate Rp of the flow rate Q in such a circumstance takes a value below the line KL2 of FIG. 5. Data of the graph is stored in the storage portion 11 in the form of a map.

As is set forth in FIG. 5, the lines KL1, KL2, and KL3 are relatively widely spaced in a region where the rotation speed of the engine 100 is at or below the rotation speed threshold Nc. In contrast, the lines KL1, KL2, and KL3 are relatively narrowly spaced in a region where the rotation speed of the engine 100 is above the rotation speed threshold Nc. Accordingly, a diagnosis performed by comparing the pulsation rate Rp with the temporary pulsation threshold Rpc1 is more accurate in the region where the rotation speed of the engine 100 is at or below the rotation threshold Nc. In other words, when a diagnosis is performed on the second purge pipe 46 regarding a connection failure in a region where the rotation speed of the engine 100 is above the rotation threshold Nc, diagnostic accuracy may possibly be reduced because the temporary pulsation threshold Rpc1 varies little even when a load of the engine 100 varies.

Figure 6:
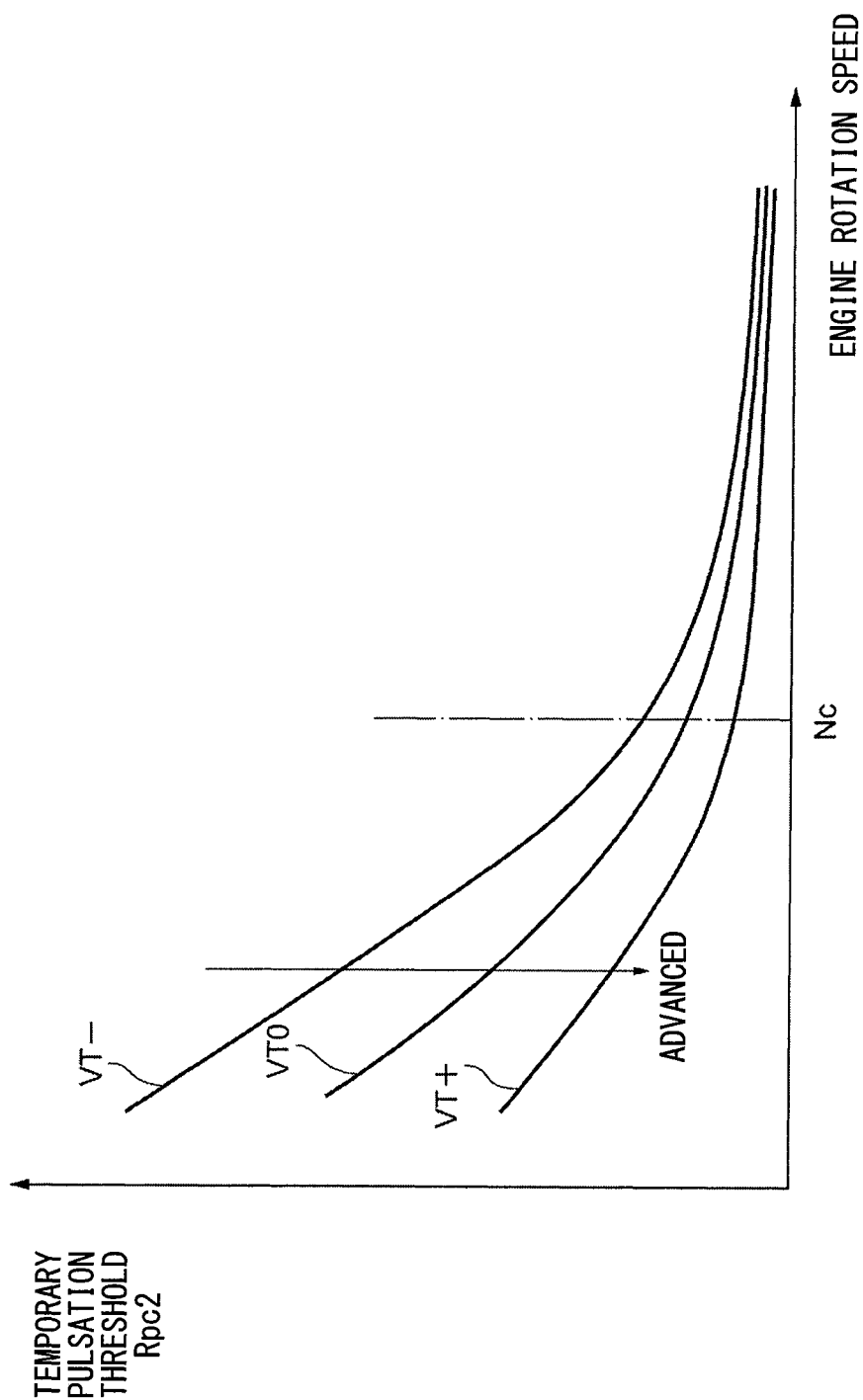
FIG. 6 is a view showing a relationship among an engine speed, a temporary pulsation threshold, and opening and closing timing of an intake valve.

FIG. 6 shows a graph of a temporary pulsation threshold Rpc2 deemed as being an appropriate pulsation threshold in terms of opening timing of the intake valve 110 of the engine 100. In the graph of FIG. 6, a rotation speed of the engine 100 is plotted along an abscissa and the temporary pulsation threshold Rpc2 is plotted along an ordinate.

In the graph, lines VT0, VT+, and VT− indicate relationships between a rotation speed of the engine 100 and the temporary pulsation threshold Rpc2 when a connection of the second purge pipe 46 to the intake pipe 21 is normal. The line VT0 indicates a relationship between a rotation speed of the engine 100 and the temporary pulsation threshold Rpc2 when opening timing of the intake value 110 is not adjusted by the variable valve timing mechanism 160. The line VT+ indicates a relationship between a rotation speed of the engine 100 and the temporary pulsation threshold Rpc2 when opening timing of the intake valve 110 is advanced by the variable valve timing mechanism 160. The line VT− indicates a relationship between a rotation speed of the engine 100 and the temporary pulsation threshold Rpc2 when opening timing of the intake valve 110 is retarded by the variable valve timing mechanism 160.

For example, in a case where opening timing of the intake valve 110 is advanced by the variable valve timing mechanism 160, the pulsation rate Rp of the flow rate Q in such a circumstance takes a value on or above the line VT+ of FIG. 6 unless a connection failure of the second purge pipe 46 occurs. On the contrary, in the event of a connection failure of the second purge pipe 46, the pulsation rate Rp of the flow rate Q in such a circumstance takes a value below the line VT+ of FIG. 6. Data of the graph is stored in the storage portion 11 in the form of a map.

As is set forth in FIG. 6, the lines VT0, VT+, and VT− are relatively widely spaced in a region where a rotation speed of the engine 100 is at or below the rotation speed threshold Nc. In contrast, the lines VT0, VT+, and VT− are relatively narrowly spaced in a region where a rotation speed of the engine 100 is above the rotation speed threshold Nc. Accordingly, a diagnosis performed by comparing the pulsation rate Rp with the temporary pulsation threshold Rpc2 is more accurate in a region where a rotation speed of the engine 100 is at or below the rotation speed threshold Nc. In other words, when a diagnosis is performed on the second purge pipe 46 regarding a connection failure in a region where a rotation speed of the engine 100 is above the rotation threshold Nc, diagnostic accuracy may possibly be reduced because the temporary pulsation threshold Rpc2 varies little even when valve opening timing of the intake valve 110 varies.

The ECU 10 sets the pulsation threshold Rpc in Step S4 of FIG. 4 according to the relationships set forth in FIG. 5 and FIG. 6. More specifically, the ECU 10 calculates the temporary pulsation threshold Rpc1 according to a rotation speed and a load of the engine 100 when the processing in Step S4 is performed and the relationships set forth in FIG. 5. Likewise, the ECU 10 calculates the temporary pulsation threshold Rpc2 according to the rotation speed and the load of the engine 100 when the processing in Step S4 is performed and the relationships set forth in FIG. 6. The ECU 10 sets the pulsation threshold Rpc by adding a weight as needed to the temporary pulsation threshold Rpc1 and the temporary pulsation threshold Rpc2 calculated in the manner as above. Larger the temporary pulsation threshold Rpc1 and the temporary pulsation threshold Rpc2, larger the pulsation threshold Rpc. That is, the pulsation threshold Rpc rises as a load of the engine 100 increases. Also, the pulsation threshold Rpc falls when opening timing of the intake valve 110 is advanced.

Subsequently, the ECU 10 determines in Step S5 whether the pulsation rate Rp of the flow rate Q is below the pulsation threshold Rpc. When it is determined that the pulsation rate Rp is at or above the pulsation threshold Rpc, the ECU 10 proceeds to Step S8, in which the ECU 10 diagnoses that a connection failure of the second purge pipe 46 is not occurring.

On the contrary, when it is determined in Step S5 that the pulsation rate Rp of the flow rate Q is below the pulsation threshold Rpc, the ECU 10 proceeds to Step S6, in which the ECU 10 diagnoses that a connection failure of the second purge pipe 46 is occurring. In such a case, the ECU 10 actuates the notification device 60 in following Step S7 and urges a user to have the engine 100 inspected or repaired.

As has been described above, in the ECU 10, the diagnostic device 15 diagnoses a connection failure of the second purge pipe 46 according to magnitude of a pulsation of the flow rate Q of the fluid flowing through the intake pipe 21. Hence, by acquiring the flow rate Q of the fluid by means of the information acquisition portion 12, a connection failure of the second purge pipe 46 can be diagnosed according to magnitude of a pulsation of the flow rate Q.

In the ECU 10, the diagnostic portion 15 diagnoses a connection failure of the second purge pipe 46 when magnitude of a pulsation of the flow rate Q of the fluid becomes smaller. Accordingly, a connection failure of the second purge pipe 46 can be diagnosed according to magnitude of a pulsation of the flow rate Q which becomes smaller when the second purge pipe 46 connected to a midpoint of the intake pipe 21 becomes disconnected and a position of the open end of the intake pipe 21 shifts toward the engine 100.

The ECU 10 includes the pulsation threshold setting portion 14 which sets the pulsation threshold Rpc. The diagnostic portion 15 calculates the pulsation rate Rp according to a ratio of magnitude of a pulsation of the flow rate Q (that is, Qmax−Qmin) with respect to an average Qave of the flow rate Q acquired by the information acquisition portion 12. The diagnostic portion 15 diagnoses a connection failure of the second purge pipe 46 when the pulsation rate Rp decreases below the pulsation threshold Rpc. Consequently, a connection failure of the second purge pipe 46 can be diagnosed in response to the flow rate Q which varies with a running state of the engine 100.

In the ECU 10, the pulsation threshold setting portion 14 sets the pulsation threshold Rpc according to a running state of the engine 100. Hence, a connection failure of the second purge pipe 46 can be diagnosed by setting the pulsation threshold Rpc appropriately to a running state of the engine 100.

In the ECU 10, the pulsation threshold setting portion 14 raises the pulsation threshold Rpc when a load of the engine 100 is high in comparison with the pulsation threshold Rpc set when a load of the engine 100 is low. Accordingly, when a flow rate Q of air supplied to the engine 100 through the intake pipe 21 increases and magnitude of a pulsation of the flow rate Q becomes larger, the pulsation threshold Rpc appropriate to the larger magnitude can be set. Consequently, a connection failure of the second purge pipe 46 can be diagnosed with a higher degree of accuracy.

The engine 100 includes the variable valve timing mechanism 160 capable of varying opening timing of the intake valve 110. When the timing is advanced, the pulsation threshold setting portion 14 lowers the pulsation threshold Rpc in comparison with the pulsation threshold Rpc set when the timing is retarded. Accordingly, when opening timing of the intake valve 110 is advanced and magnitude of a resulting pulsation of the flow rate Q becomes smaller, the pulsation threshold Rpc appropriate to the smaller magnitude can be set. Consequently, a diagnosis by the diagnostic portion 15 can be more accurate.

In the ECU 10, the diagnostic portion 15 performs a diagnosis on the second purge pipe 46 through which to supply evaporation gas, that is, a fuel gas generated in the fuel tank 30 where liquid fuel is stored, regarding a connection failure. Hence, presence or absence of an abnormality that an evaporation gas is released to air because of a connection failure of the second purge pipe 46 can be diagnosed.

In the ECU 10, the diagnostic portion 15 does not perform a diagnosis when a rotation speed of the engine 100 is above the rotation speed threshold Nc. Hence, the diagnostic portion 15 is allowed to perform a diagnosis only under a condition that an obvious variance appears in magnitude of a pulsation of the flow rate Q due to a connection failure of the second purge pipe 46. Consequently, a wrong diagnosis by the diagnostic portion 15 can be prevented.

In the ECU 10, the diagnostic portion 15 does not perform a diagnosis while the compressor 23, which is a supercharger fitted to the intake pipe 21, is driven. Hence, the diagnostic portion 15 is allowed to perform a diagnosis only under a condition that an obvious variance appears in magnitude of a pulsation of the flow rate Q due to a connection failure of the second purge pipe 46. Consequently, a wrong diagnosis by the diagnostic portion 15 can be prevented.

Second Embodiment

Figure 7:
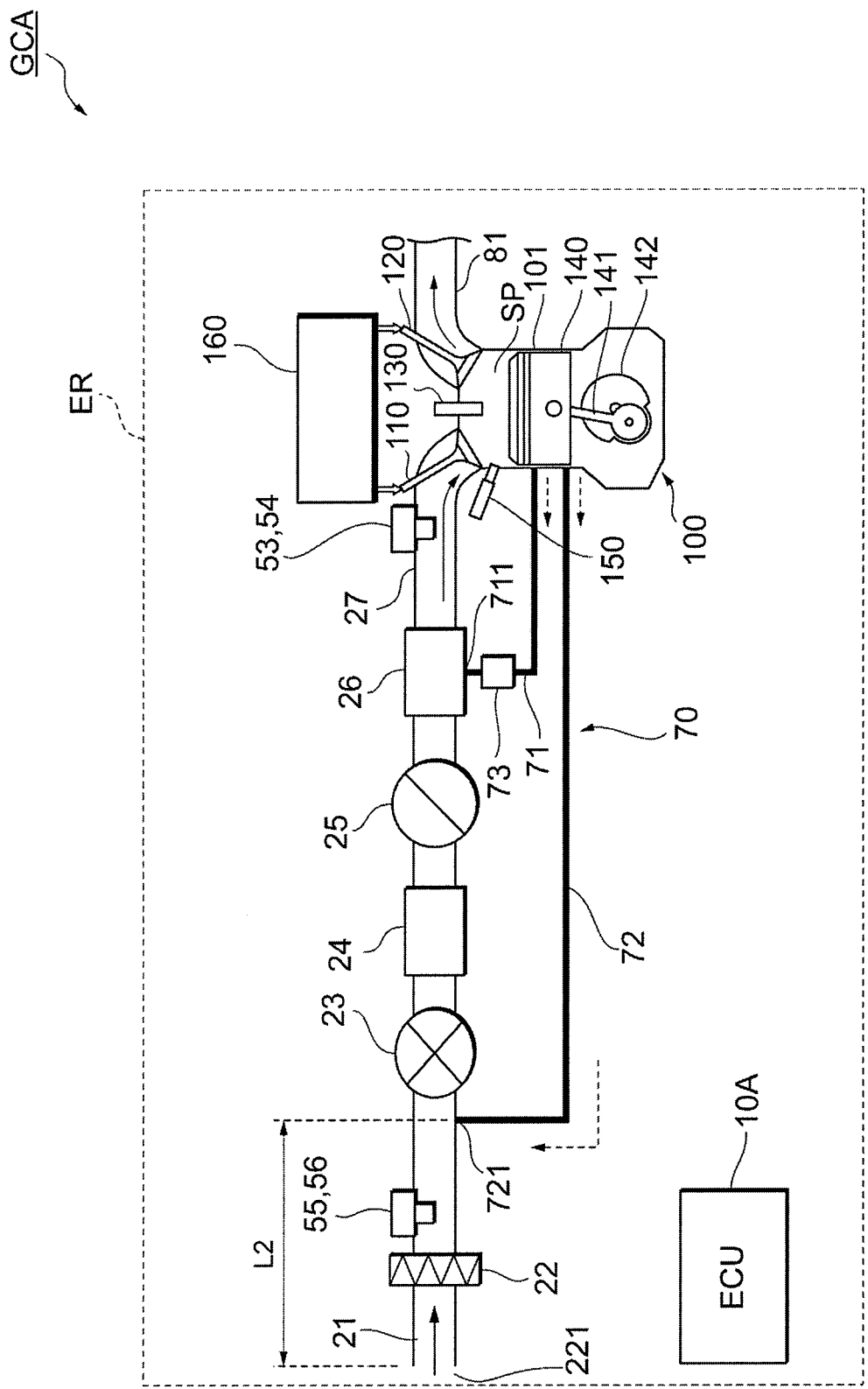
FIG. 7 is a schematic view of an ECU and other components according to a second embodiment.

An ECU 10A which is a diagnostic device according to a second embodiment will be described with reference to FIG. 7. The ECU 10A (diagnostic device) is a control unit equipped to a vehicle GCA. The ECU 10A is different from the ECU 10 of the first embodiment above in that the ECU 10A chiefly diagnoses a connection failure of a second PCV pipe 72 (fuel gas pipe, circulation pipe). Configurations of the ECU 10A and the vehicle GCA same as the configurations of the ECU 10 and the vehicle GC described above are labelled with same reference numerals and a description is not repeated.

Firstly, the vehicle GCA will be described. As is shown in FIG. 7, the vehicle GCA includes a PCV system 70 in addition to an engine 100, an intake system 20, and a fuel tank 30. The PCV system 70 has a first PCV pipe 71 and a second PCV pipe 72.

The first PCV pipe 71 is a tube-shaped member defining an inner channel. One end of the first PCV pipe 71 is connected to an unillustrated crankcase of the engine 100 and the other end 711 is connected to a surge tank 26. Hence, the crankcase of the engine 100 and the surge tank 26 communicate with each other through the first PCV pipe 72. A PCV valve 73 is fitted to the first PCV pipe 71 at a midpoint. The PCV valve 73 is a check valve opening and closing in response to a pressure difference between upstream and downstream.

The second PCV pipe 72 is a tube-shaped member defining an inner channel. One end of the second PCV pipe 72 is connected to the unillustrated crankcase of the engine 100 and the other end 721 is connected to an intake pipe 21. To be more specific, the end 721 of the second PCV pipe 72 is connected to the intake pipe 21 at a portion upstream of a compressor 23 and downstream of an air element 22.

A function of the PCV system 70 configured as above will now be described. In the engine 100, a fuel gas (hereinafter, referred to also as a blow-by gas) may possibly leak from a clearance between respective cylinders 101 and corresponding pistons 140. A blow-by gas accumulated in the crankcase may cause deterioration of engine oil, corrosion of metal, and so on. In order to reduce such an inconvenience, the PCV system 70 functions to return a blow-by gas to the respective cylinders 101 by forcing the blow-by gas out from the crankcase. The PCV system 70 has the first PCV pipe 71 and the second PCV pipe 72 as circulation pipes through which to supply an unburned fuel gas generated in the engine 100.

In a case where the engine 100 is running without driving the compressor 23, a negative pressure develops as a fluid flows through the intake pipe 21 and acts on the crankcase via the first PCV pipe 71 and the second PCV pipe 72. A blow-by gas is thus forced out from the crankcase.

Meanwhile, in a case where the engine 100 is running with driving the compressor 23, a blow-by gas is forced out through the second PCV pipe 72. As has been described, the second PCV pipe 72 is connected to the intake pipe 21 at a portion upstream of the compressor 23. Hence, when the compressor 23 is driven, a negative pressure develops with driving of the compressor 23 and acts on the crankcase via the second PCV pipe 72. A blow-by gas is thus forced out from the crankcase.

While the compressor 23 is driven, an internal pressure of the surge tank 26 located downstream of the compressor 23 is positive. The PCV valve 73 closes when an internal pressure of the first PCV pipe 71 becomes higher on a downstream side of the PCV valve 73 than on an upstream side. A fluid is thus prevented from flowing into the first PCV pipe 71 from the surge tank 26.

In the manner as above, a blow-by gas forced out from the crankcase of the engine 100 flows into the intake pipe 21 and mixes with air drawn in from an end 211. A mixture of the blow-by gas and air is supplied to the respective cylinders 101 of the engine 100 by directly flowing through the intake pipe 21. Consequently, fuel consumption of the engine 100 can be improved by using a blow-by gas to run the engine 100 without releasing the blown-by gas to air.

The vehicle GCA configured as above has a potential risk of an inconvenience related to processing of a blow-by gas in the event of a connection failure of the second PCV pipe 72. That is, when the end 721 of the second PCV pipe 72 normally connected to a midpoint of the intake pipe 21 becomes disconnected from the intake pipe 21 due to an impact from the outside, a blow-by gas flowing through the second PCV pipe 72 may possibly be released to air.

When the end 721 of the second PCV pipe 72 becomes disconnected from the intake pipe 21, air is also drawn in from a midpoint of the intake pipe 21 where the end 721 had been connected. That is, a position of an open end of the intake pipe 21 shifts toward the engine 100 by a distance L2 specified in FIG. 7.

When the position of the open end shifts as above, a resonance point of a fluid flowing through the intake pipe 21 varies, which causes magnitude of a pulsation of a flow rate Q of the fluid flowing through the intake pipe 21 to vary. Hence, the ECU 10A become capable of diagnosing a connection failure of the second PCV pipe 72 by performing processing same as the processing performed by the ECU 10 of the first embodiment above. That is, a connection failure of the second PCV pipe 72 can be diagnosed according to a variance in magnitude of a pulsation of the flow rate Q of the fluid flowing through the intake pipe 21.

As has been described above, in the ECU 10, a diagnostic portion 15 performs a diagnosis on the second PCV pipe 72 through which to supply a blow-by gas generated in the engine 100 regarding a connection failure. Presence or absence of an abnormality that a blow-by gas is released to air due to a connection failure of the second PCV pipe 72 can be thus diagnosed.

While the above has described the embodiments with reference to specific examples, it should be appreciated that the present disclosure is not limited to the specific examples above. The specific examples modified in design by anyone skilled in the art are also within the scope of the present disclosure as long as a resulting modification has the characteristics of the present disclosure. Respective elements included in each specific example, locations, conditions, shapes, and so on of the elements are not limited to what have been specified in the description above and can be changed as needed. A combination of elements of the respective specific examples can be changed as needed unless a technical contradiction arises.

For example, the embodiments above have described the engine 100 having three cylinders 101 as an example. However, the present disclosure is not limited to the configuration as above. That is, the diagnostic device of the present disclosure applied to an engine having four or more cylinders is also capable of diagnosing a connection failure of a fuel gas pipe through which to supply an evaporation gas or a blow-by gas to a midpoint of the intake pipe.

In a case of an engine having four or more cylinders, the intake stroke is taking place in the respective cylinders at a same time during some time zones. During such time zones, a pulsation of a flow rate of a fluid flowing through the intake pipe becomes smaller and it becomes difficult to diagnose a connection failure of a fuel gas pipe with accuracy.

Hence, in a case where the engine has four or more cylinders, it is preferable that the diagnostic portion of the diagnostic device performs a diagnosis on the fuel gas pipe regarding a connection failure only when the engine is running by suspending fuel combustion in at least one cylinder. For example, in a case where the engine has six cylinders, it is preferable to perform a diagnosis on the fuel gas pipe regarding a connection failure only when the engine is running while fuel combustion is suspended in three cylinders. Accordingly, the diagnostic portion is allowed to perform a diagnosis only under a condition that an obvious variance appears in magnitude of a pulsation of a flow rate of a fluid flowing through the intake pipe. Consequently, a wrong diagnosis by the diagnostic portion can be prevented.

In the embodiments above, the pulsation threshold setting portion 14 sets the pulsation threshold Rpc according to a rotation speed and a load of the engine 100 and opening timing of the intake valve 110. However, the present disclosure is not limited to the configuration as above. For example, because a resonance point of a fluid is susceptible also to a sound speed, the pulsation threshold Rpc may be fine-tuned according to factors having influences on a sound speed, such as a temperature of air outside the vehicle GC or GCA, and a temperature and a humidity of a fluid flowing through the intake pipe 21. A diagnosis of a connection failure of the second purge pipe 46 or the second PCV pipe 72 can be thus more accurate.

The embodiments above have described a direct injection engine in which fuel is directly injected from the injector 150 into the combustion chamber SP as the engine 100. However, an application of the present disclosure is not limited to the engine 100 of a direct injection type. That is, the engine 100 may be a port-injection engine in which fuel is injected to a point upstream of the intake valve 110.

The invention claimed is:

1. A diagnostic device diagnosing a fuel gas pipe connected to an intake pipe of an engine, comprising:
   a flow rate acquisition portion acquiring a flow rate of a fluid flowing through the intake pipe; and
   a diagnostic portion performing a diagnosis on the fuel gas pipe regarding a connection failure,
   wherein the diagnostic portion performs the diagnosis according to a magnitude of a pulsation of the flow rate acquired by the flow rate acquisition portion,
   wherein the diagnostic portion diagnoses a connection failure of the fuel gas pipe when the magnitude of the pulsation becomes smaller,
   wherein the diagnostic device further comprises a pulsation threshold setting portion setting a pulsation threshold, and
   wherein the diagnostic portion calculates a pulsation rate according to a ratio of magnitude of the pulsation with respect to an average of the flow rate acquired by the flow rate acquisition portion and diagnoses a connection failure of the fuel gas pipe when the pulsation rate decreases below the pulsation threshold.

2. The diagnostic device according to claim 1, wherein:
   the pulsation threshold setting portion sets the pulsation threshold according to a running state of the engine.

3. The diagnostic device according to claim 2, wherein:
   the pulsation threshold setting portion raises the pulsation threshold when a load of the engine is high in comparison with the pulsation threshold set when the load of the engine is low.

4. The diagnostic device according to claim 2, wherein:
   the engine includes a variable valve timing mechanism capable of varying opening timing of an intake valve; and
   the pulsation threshold setting portion lowers the pulsation threshold when the timing is advanced in comparison with the pulsation threshold set when the timing is retarded.

5. The diagnostic device according to claim 1, wherein:
   the diagnostic portion performs a diagnosis on at least one of a purge pipe through which to supply a fuel gas generated in a fuel tank where liquid fuel is stored and a circulation pipe through which to supply an unburned fuel gas generated in the engine regarding a connection failure.

6. The diagnostic device according to claim 1, wherein:
   the diagnostic portion does not perform the diagnosis when a rotations speed of the engine is above a rotation speed threshold.

7. A diagnostic device diagnosing a fuel gas pipe connected to an intake pipe of an engine, comprising:
   a flow rate acquisition portion acquiring a flow rate of a fluid flowing through the intake pipe; and
   a diagnostic portion performing a diagnosis on the fuel gas pipe regarding a connection failure, wherein the diagnostic portion performs the diagnosis according to a magnitude of a pulsation of the flow rate acquired by the flow rate acquisition portion; and wherein the diagnostic portion does not perform the diagnosis when a supercharger fitted to the intake pipe is driven.

8. A diagnostic device diagnosing a fuel gas pipe connected to an intake pipe of an engine, comprising:

a flow rate acquisition portion acquiring a flow rate of a fluid flowing through the intake pipe; and a diagnostic portion performing a diagnosis on the fuel gas pipe regarding a connection failure, wherein the diagnostic portion performs the diagnosis according to a magnitude of a pulsation of the flow rate acquired by the flow rate acquisition portion;

wherein the engine includes at least four cylinders; and wherein the diagnostic portion performs the diagnosis only when the engine is running by suspending fuel combustion in at least one cylinder.

* * * * *